United States Patent [19]
Smith

[11] 4,023,892
[45] * May 17, 1977

[54] DAZZLE PROTECTION SPECTACLE DEVICES FOR NOCTURNAL DRIVERS OF MOTOR VEHICLES

[76] Inventor: Robert Smith, No. 122 Edge View Lane, Rochester, N.Y. 14618

[*] Notice: The portion of the term of this patent subsequent to Nov. 17, 1992, has been disclaimed.

[22] Filed: Nov. 20, 1969

[21] Appl. No.: 878,449

[52] U.S. Cl. .................................. 351/45; 351/47
[51] Int. Cl.² ...................... G02C 7/16; G02C 9/00
[58] Field of Search ............................. 351/44–47

[56] References Cited
UNITED STATES PATENTS

| 1,740,835 | 12/1929 | Riderich | 351/45 X |
| 2,120,727 | 6/1938 | Bell | 351/45 |
| 2,146,544 | 2/1939 | Kleine | 351/45 UX |
| 3,111,675 | 11/1963 | Mora | 351/45 UX |
| 3,421,233 | 1/1969 | Gaal | 351/45 X |

FOREIGN PATENTS OR APPLICATIONS

| 1,000,379 | 10/1951 | France | 351/45 |
| 1,175,873 | 11/1958 | France | 351/45 |
| 271,764 | 2/1930 | Italy | 351/45 |

OTHER PUBLICATIONS

"The Perception of Brightness and Darkness," Leo M. Hurvich et al., 1966.

*Primary Examiner*—Paul A. Sacher
*Attorney, Agent, or Firm*—Martin Lukacher

[57] ABSTRACT

Spectacle frame with plano or prescription lenses, or having no lenses, is provided with screen or shield structure only for the eye farthest from the lane of approaching traffic to protect against dazzle from the lights of approaching vehicles. In the United States, where "right hand driving" is the traffic rule, such protection is only for the right eye. The screen shields the inner or nasal half of the protected eye, the full height of the lens rim. At the protected eye, the frame may also have a screen across the minor upper part of the lens rim. The screens may be opaque, or a filter, neutral or colored, having a density of 0.5 to 1.5, which is found practical. The screens may be of sheet material, releasably movably mounted, so their positions are adjustable. This invention utilizes better and more effectively the characteristics of eye behavior, that protection of only one eye, with maintainance of vision, will protect a nocturnal driver from dazzle and discomfort. Use of this invention allows full free movement of the driver's head.

14 Claims, 6 Drawing Figures

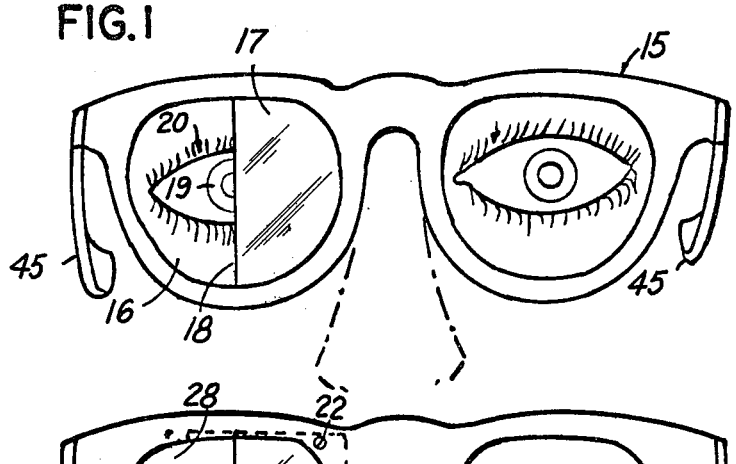
FIG. 1
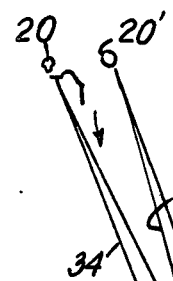
FIG. 2
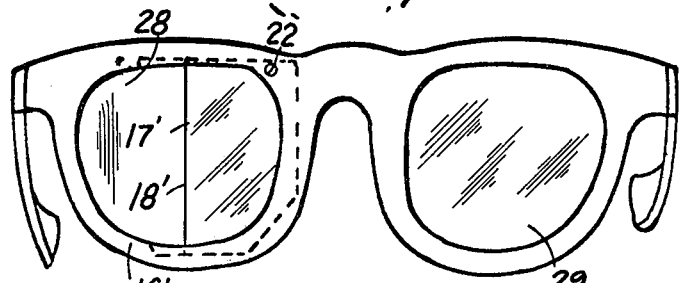
FIG. 3
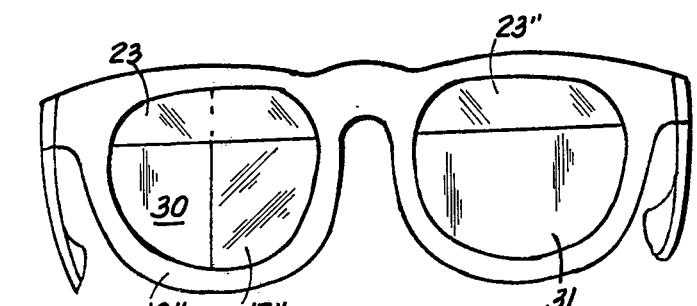
FIG. 4
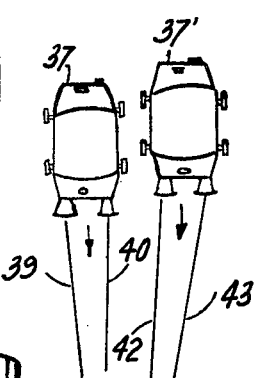
FIG. 6
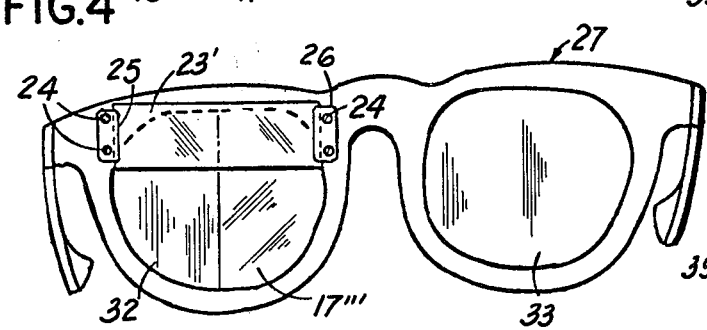
FIG. 5
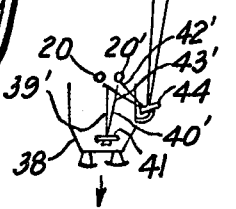

DAZZLE PROTECTION SPECTACLE DEVICES FOR NOCTURNAL DRIVERS OF MOTOR VEHICLES

The present invention relates, and its principal object is to provide spectacles for protecting the eyes of a nocturnal driver of a motor vehicle, from the dazzling effects produced by the glare or lights and light reflections he becomes subject to. The main sources of glare causing such annoyance and attendent ill effects, are the lights of oncoming vehicles, road, street and sign lights, the reflections of light into his eyes from his vehicles's rear vision and side mirrors caused by following vehicles and from stationary objects along the road, heavy rain or snowfall, and the like; such spectacles affording no appreciable interference with the driver's visual field, and giving him an unrestricted view of the road and its environs.

Heretofore, an obvious means of protecting the eyes from dazzle and glare, was to have a partially-light-absorbing screen in front of the driver's eyes. Tinted spectacles and windshields, as well as windshield attachments have been used, but all have the serious disadvantage of material reduction in visibility of objects under night driving conditions. Light absorbing segments of various crescent and triangular shapes applied to the surfaces of spectacle lenses, spectacle frames or to the windshield, have also been attempted, but these have the serious disadvantages of interfering with the visual field, and requiring that the driver carefully adjust his spectacles and maintain one certain position to orient his head and eyes in order that such devices can be utilized. The ensuing fatigue was hardly worth while for any anti-dazzle attained, and at best they offered a very limited protection because only glare in a small part of the visual field is screened.

It is therefore another object of this invention to provide novel and improved spectacle constructions which obviate the aforesaid objectionable incidents and particularly allow the driver, full, free, normal head movements, and allow effective use of the full field of vision, and permit him to enjoy freedom from discomfort and from serious visual disability due to glare from headlights of vehicles in any position in front of him. Previous employed have not been effective and have proven unsatisfactory.

A further object thereof, is to provide anti-dazzle spectacles, which better utilizes the characteristics of eye behavior, that protection of only one eye from dazzle, with maintainance of vision, will protect the vision of nocturnal drivers. This is true for light intensities encountered in night driving.

Still a further object of this invention is to provide novel and improved anti-dazzle spectacles of the character described, which have the aforementioned attributes, and which are simple in construction, reasonable in cost to manufacture, presenting no problems in use, and which are efficient in carrying out the purposes for which they are designed.

Other objects and advantages will become apparent as this disclosure proceeds.

For one practice of this invention, better utilizing various physical eye behavorisms, by taking advantage optimaly of the independence of the adaptability of the two eyes and to protect against discomfort glare by means of arrangements that optimaly utilize the mechanism of the summation of the brightness effects in binocular vision, I provide a spectacle frame with or without lenses, and for "right hand driving" use, mount a screen to shield the inner half of the right lens, its entire height. By inner or inward is meant the side next to the nose or nasal side of the lens. I may also have a screen across the minor upper part of the lens rim. The screen may be opaque metal or plastic sheeting, or be a filter, neutral or colored, having a density of 0.5 to 1.5. The screen may be a coating applied to the surface of the lens, or may be provided by imbibing light-absorbing dyestuffs into the lens material. When of stiff sheet material, the screens may be releasably movably mounted on the frame, for adjustability. Nothing is applied to the left lens.

Various embodiments of this invention wll now be described in detail, for which I will refer to the accompanying drawing, forming part of this specification, in which drawing, similar characters of reference indicates corresponding parts in all the views.

FIG. 1 is a front view of a spectacle frame embodying teachings of this invention, shown worn by the driver of a motor vehicle. Here, the frame is without lenses.

FIG. 2 is a diagram of light rays from the headlights of an oncoming vehicle, coming to the eyes of the driver wearing the spectacles of FIG. 1.

FIGS. 3, 4 and 5 are front views of modified constructions of the dazzle-protection spectacles, in accordance with this invention.

FIG. 6 is a diagram of light rays from the headlights of vehicles following the driver, coming to the eyes of this driver wearing one of the spectacles taught herein, as reflected rays from his vehicle's external side mirror and from his vehicle's internal rear view mirror.

In the drawing, the numeral 15 designates a spectacle frame whose right eye lens rim 16 is shielded by a screen 17, extending the full height of said rim and covering the inward half thereof, so when the eyes look directly forward, the vertical screen edge 18, preferably bisects the pupil 19 of the right eye 20. If desired, the screen, as shown at 17', may by slidably mounted for horizontal movement, so the position of the edge 18' may be adjusted to center or a bit off center to suit the particular wearer. Once the adjustment is made, the slide is fixed by means of the set screw 22. Suitable channel tracks in the body of the lens rim 16', are provided for the screen 17', which are believed readily understood without the need of further illustration. In addition to the screen as 17" which shields the inner half of the right eye, there be the horizontal screen element 23, which covers a minor upper lane across the lends rim 16", and a similar upper horizontal screen element 23" may be provided on the other lens rim. If desired, this horizontal screen may be mounted for adjustment along the vertical, to suit the particular wearer, who can fix it in place by tightening the screws 24 securing the clamping pieces 25,26 on the frame 27.

All screens 17, 17', 17", 17''', 23, 23" and 23', may be opaque, or of material having some transparent filter quality, for which a density of between 0.5 and 1.5 is recommended, and they need be no more dense than is necessary to protect against the levels of brightness encountered in night driving. All screens may be plastic or metal sheeting, or merely a coating applied to the lens. The spectacle frames may be without lenses as in FIG. 1, or with lenses fitted therein, and shown at 28, 29, 30, 31, 32 and 33; such lenses being plano, or corrective, clear or colored. When applied to lenses, all screens may be on either or both surfaces, or incorporated therein. As a special case which might be desirous for some drivers who need it, the lenses may be for the correction of night myopia.

As mentioned herein, these spectacles for night drivers taught herein, utilize better and more effectively the eye behavior characteristics, that protection of only one eye from dazzle, with maintainance of vision, will protect vision of nocturnal drivers from dazzle.

Light rays from other vehicles on the road, and from other light sources on the road, to which a driver is subject to, will now be indicated. The numeral 36 in FIG. 2, designates a vehicle in another lane, approaching the driver's vehicle. The rays of light 34,35 from the head lights of the oncoming vehicle 36, will impinge on the screen (of the series 17) shielding entrance to pupil of the driver's right eye 20. None of these rays 34,35 will strongly impinge on the pupil of said right eye 20. The rays of light 34', 35' from said headlights of the vehicle 36, will come onto the left eye of the driver. Being that the eye 20 is protected from the rays issuing from the headlights of the vehicle 36, such protection from dazzle of the eye 20 will protect against imparment of vision from dazzle. It is to be noted that the protection of the eye 20 in this manner, has not interfered with the vision of the driver.

In the lanes of approaching traffic, only some of the vehicles will be at the same level as the driver. Some headlights will appear therefore above or below the driver's eyes as in the case of vehicles approaching up or down a hill relative to the driver. The vertical disposition of the screen 17, thus shields the eye from glare sources distributed vertically. Headlights on vehicles approaching a driver around a curve from the driver's left, are particularly a hazardous source of glare. The disposition of the screen as described, also protects the driver from the glare light under these conditions.

I might mention here, that the optional screens across the upper portions of the eyes, as the screen elements 23, 23'' and 23', are for protection of the eyes from the rays of overhead lights, as for instance from the road's lighting equipment in front of the driver.

These spectacle devices for night driving, as taught herein, also protect the right eye 20 from rays coming from the headlights of vehicles 37 and 37', which follow the driver's vehicle. The light rays from the headlights of the vehicle 37 which is directly in back of the driver's vehicle 38, may as do the rays 39,40 passinto the driver's vehicle through the rear window, and be reflected back into the eyes of the driver from the internal rear view mirror 41, as the reflected rays 39'. The reflected ray 39' will impinge on the shield 17 or 23, thus protecting the right eye 20. The reflected ray 40 will impinge on the left eye 20'. Having attained the necessary protection of one eye from dazzle without interruption to vision, will protect against imparment of vision from dazzle. The light rays from the headlights of the vehicle 37', which is in a lane aside the driver's vehicle 38, may as do the rays 42,43, impinge on the face of the external side view mirror 44, and be reflected back to the driver's eyes. The reflected ray 42' will be intercepted by the screen 17. The reflected ray 43' will impinge on the left eye 20'. Having attained the necessary protection of one eye without interruption of vision, will protect against imparment of vision from dazzle.

Drivers using these spectacles for considerable distances at night, have been subjected to all of said conditions met with on the road, and have found said spectacles effective in eliminating dazzle of both the disability and discomfort types.

Although I have shown this invention in spectacles of the type including temples as 45, its teachings may be incorporated in eyeglass frames of all kinds, in goggles, and in all manner of opthomalic mountings, and so it is intended and desired that the term spectacle frames anywhere appearing in this specification and in the appended claims, shall be deemed to include all of them.

In England, and other places where left hand driving is the traffic rule, the protected eye would be the left eye.

Of importance to note is that the driver's head has full freedom of movement and is not restricted to a rigid position while driving, using spectacles taught herein. Movement of the head from side to side should be at a minimum, but up and down movements of the head need no limitation. The vertical edge 18 of the screen 17, should extend across the eye and beyond it upwardly and downwardly. The dimensions of the lens rims of usual frames, already provide for this.

This invention is capable of numerous forms and various applications without departing from the essential features herein disclosed. It is therefore intended and desired that the embodiments shown herein shall be deemed merely illustrative and not restrictive, and that the patent shall cover all patentably novelty herein set forth.

I claim:

1. In a dazzle protection device for nocturnal drivers of motor vehicles which drivers have binocular vision out of two eyes, a screen element positioned continuously in front of only a predetermined one of the two eyes of the driver when the device is worn by the driver, the other of said two eyes being entirely unshielded, and means for carrying said screen element, said means for carrying being adapted for releasable attachment to the driver; said screen element when the device is worn, covering the inward part of the surface of said one eye, commencing from the inward end of one eye and extending predetermined distances toward the outer end of said one eye and above and below said one eye; the most outer edge of said screen element being substantially upright and crossing said eye; said screen element being of a material having the quality that it will sufficiently shield the eye against the levels of brightness of light encountered in night driving.

2. A device as defined in claim 1, wherein said edge is vertical.

3. A device as defined in claim 1, wherein said edge crosses the pupil of said eye.

4. A device as defined in claim 1, wherein said edge crosses approximately the center of the pupil of said eye.

5. A device as defined in claim 1, wherein said screen element has some transparent filter quality.

6. A device as defined in claim 1, wherein the density of the screen element is between 0.5 and 1.5.

7. A device as defined in claim 1, wherein the said means is a spectacle frame carrying a member whose perimeter encircles said eye and which offers no interference to the vision of said eye; said screen being carried on said member and within its confines.

8. A device as defined in claim 7, wherein said member is a lens rim.

9. A device as defined in claim 7, wherein said member is a lens.

10. A device as defined in claim 9, wherein said lens is correctional.

11. A device as defined in claim 9, wherein said lens is correctional; the correction being for myopic night driving.

12. A device as defined in claim 1, wherein the screen element is mounted for movement along the horizontal on said means carrying it.

13. A device as defined in claim 1, wherein said means is a spectacle frame carrying a lens rim member which encircles said eye; said screen element being carried by said rim for movement thereon along the horizontal.

14. An anti-glare device for use by a driver when driving along a road at night, said device comprising a screen disposed continuously to shield a substantial portion of the nasal half of only one of the two eyes of the driver, the other of said two eyes being entirely unshielded.

* * * * *